United States Patent
Okuma

(10) Patent No.: US 11,521,365 B2
(45) Date of Patent: Dec. 6, 2022

(54) IMAGE PROCESSING SYSTEM, IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keisui Okuma, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 191 days.

(21) Appl. No.: 16/830,042

(22) Filed: Mar. 25, 2020

(65) Prior Publication Data
US 2020/0320325 A1   Oct. 8, 2020

(30) Foreign Application Priority Data
Apr. 2, 2019 (JP) .............................. JP2019-070710

(51) Int. Cl.
*G06V 10/22* (2022.01)
*G06K 9/62* (2022.01)
*G06V 30/10* (2022.01)

(52) U.S. Cl.
CPC ........... *G06V 10/22* (2022.01); *G06K 9/6256* (2013.01); *G06V 30/10* (2022.01)

(58) Field of Classification Search
None
See application file for complete search history.

(56) References Cited

U.S. PATENT DOCUMENTS

| 2007/0133020 | A1 | 6/2007 | Uejo et al. | 358/1.9 |
| 2015/0070361 | A1* | 3/2015 | Xu | G06F 40/109 |
| | | | | 345/467 |
| 2020/0320325 | A1* | 10/2020 | Okuma | G06K 9/00456 |
| 2021/0201548 | A1* | 7/2021 | Ozeki | G09G 5/24 |
| 2021/0279497 | A1* | 9/2021 | Chiba | G06F 21/552 |

FOREIGN PATENT DOCUMENTS

| JP | 2007-166287 | 6/2007 |
| JP | 2013-182512 | 9/2013 |

OTHER PUBLICATIONS

Y. Jiang, et al., "DCFont: An End-to-End Deep Chinese Font Generation System", in SIGGRAPH Asia 2017 Technical Briefs, p. 22. ACM, 2017.
A. Krizhevsky, et al., "ImageNet Classification with Deep Convolutional Neural Networks", part of: Advances in Neural Information Processing Systems 25 (NIPS 2012).

* cited by examiner

Primary Examiner — Edward Park
(74) Attorney, Agent, or Firm — Venable LLP

(57) ABSTRACT

An image processing system acquires a scanned image obtained by scanning an original, and extracts a character region that includes characters from within the scanned image. The image processing system performs conversion processing, for converting a font of a character included in the extracted character region from a first font to a second font, on the scanned image using a conversion model for which training has been performed in advance so as to convert characters of the first font in an inputted image into characters of the second font and output a converted image. Then, the image processing system executes OCR on the scanned image after the conversion processing.

11 Claims, 13 Drawing Sheets

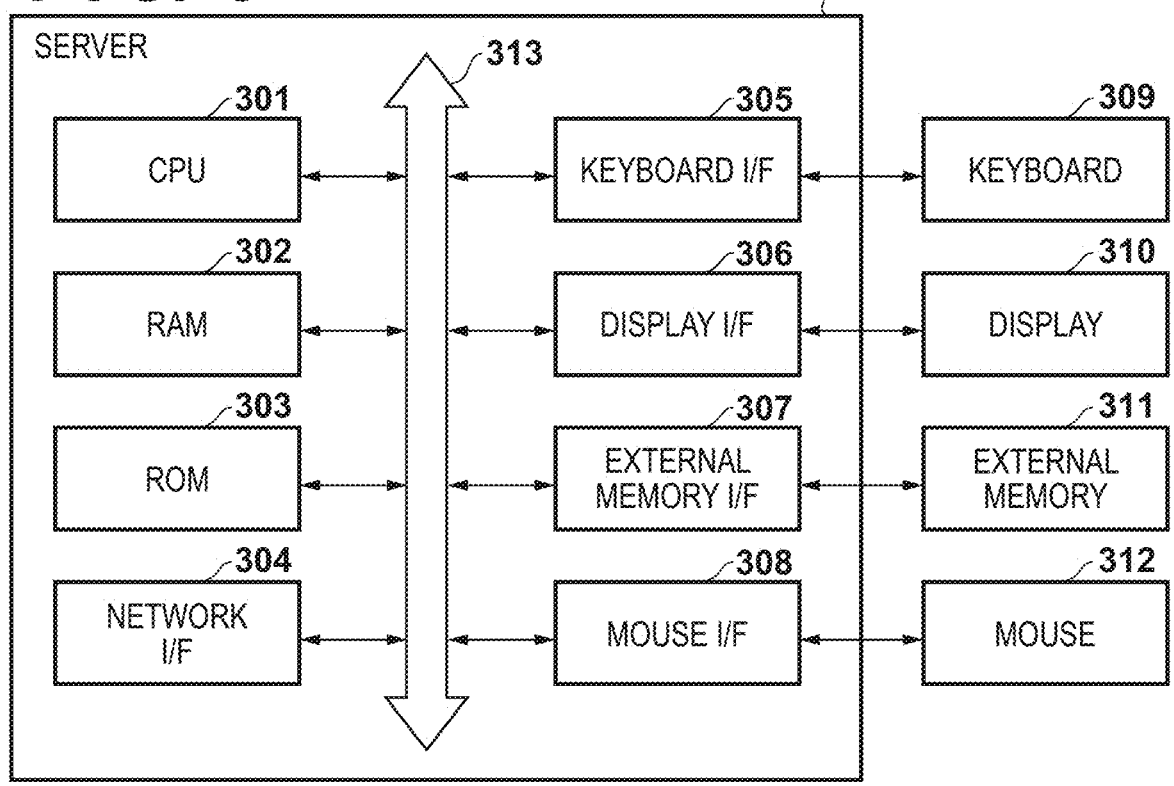
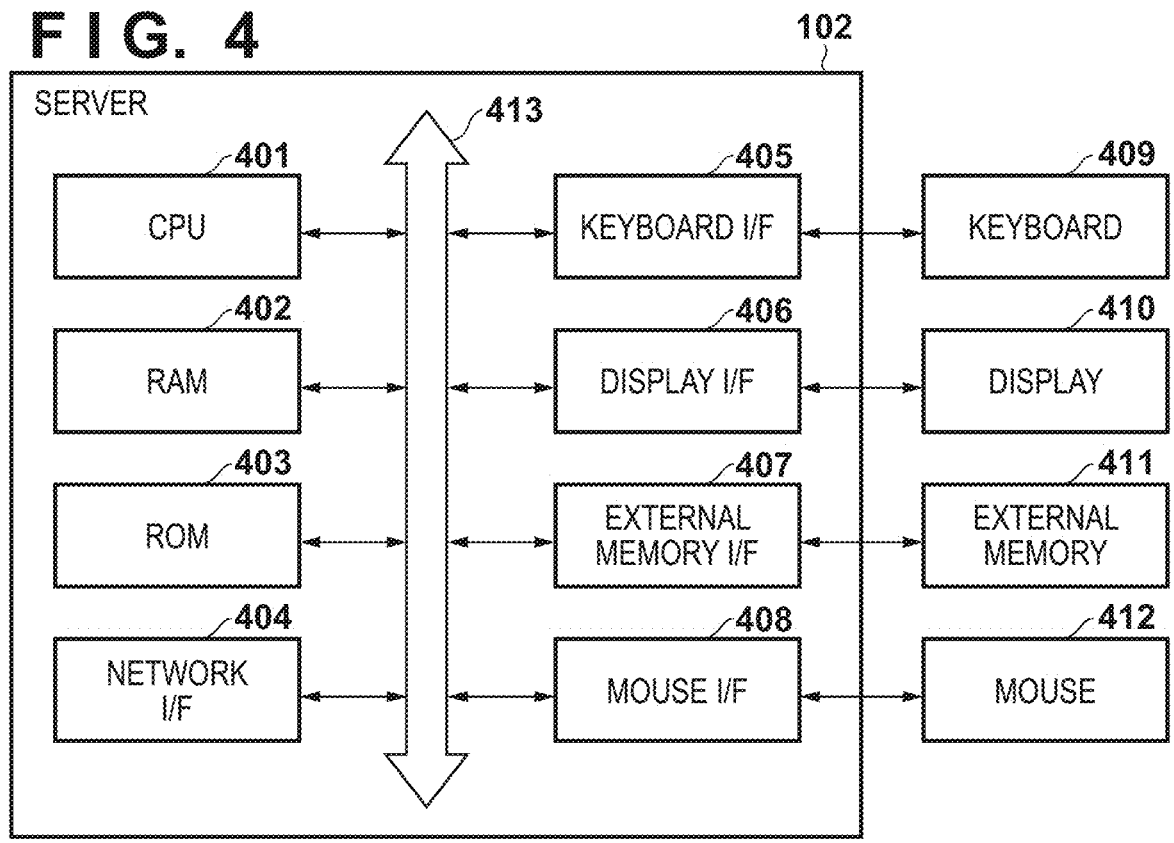

FIG. 6
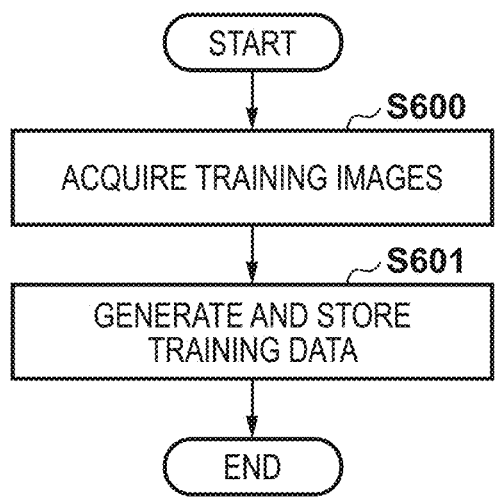
FIG. 7
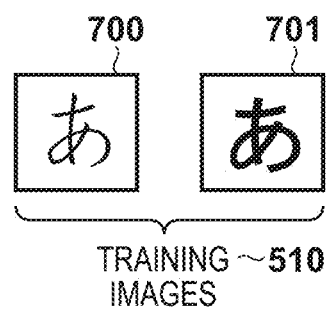
FIG. 8
| ID | PRE-CONVERSION IMAGE (OCR NON-RECOMMENDED FONT) | CORRECT IMAGE (OCR RECOMMENDED FONT) |
|---|---|---|
| 1 | あ ~700 | あ ~701 |
| 2 | い | い |
| 3 | う | う |
| ⋮ | | |

TRAINING IMAGES

FIG. 16

| ID | PRE-CONVERSION IMAGE (OCR NON-RECOMMENDED FONT) | CORRECT IMAGE (OCR RECOMMENDED FONT) |
|---|---|---|
| 1 | ~1500 | ~1501 |
| 2 | | |
| 3 | | |
| ⋮ | | |

FIG. 17A  FIG. 17B

F I G. 18
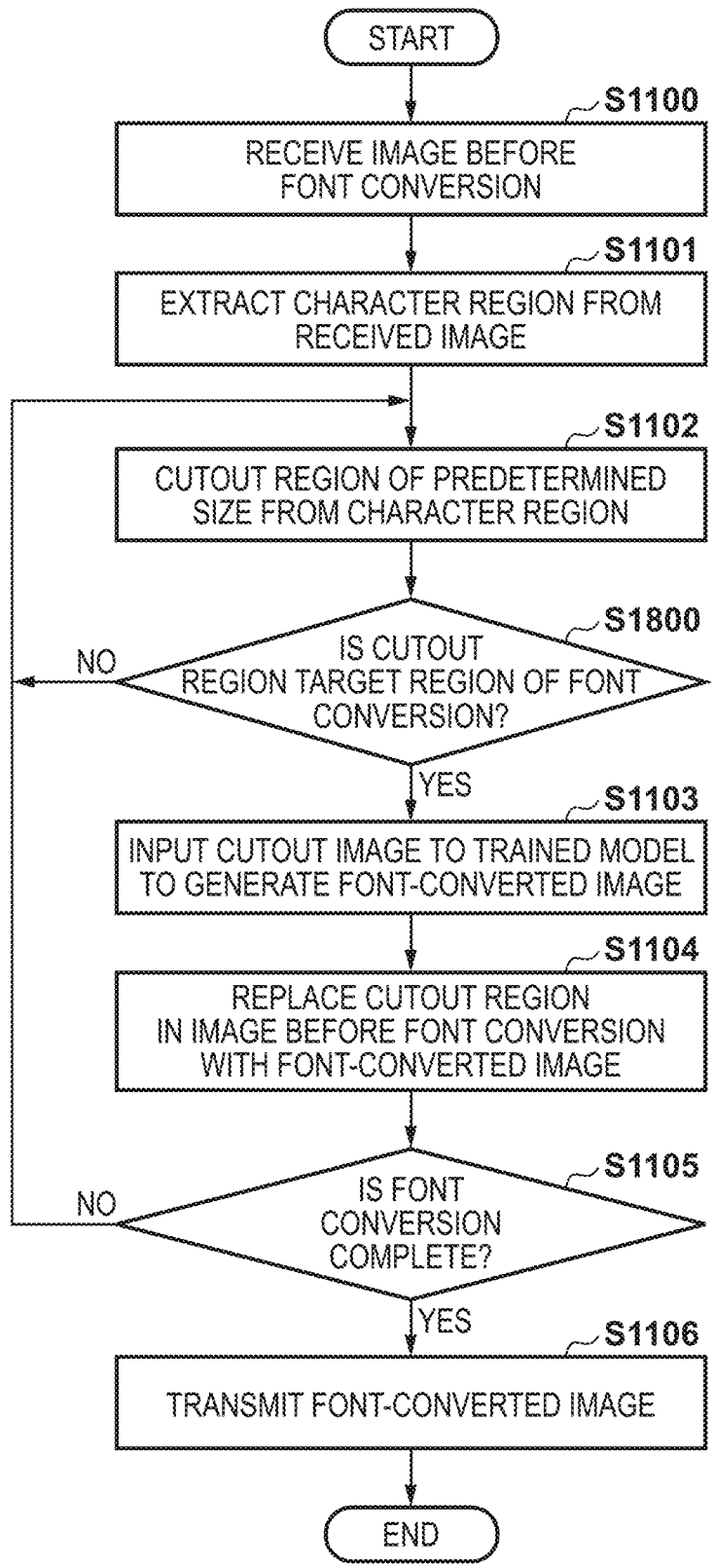

FIG. 19A

| ID | PRE-CONVERSION IMAGE (OCR NON-RECOMMENDED FONT) | CORRECT IMAGE (OCR RECOMMENDED FONT) |
|---|---|---|
| | ⋮ | ⋮ |
| 52 | つ | つ ~1901 |
| | ⋮ | |

FIG. 19B

| ID | PRE-CONVERSION IMAGE (OCR NON-RECOMMENDED FONT) | CORRECT IMAGE (OCR RECOMMENDED FONT) |
|---|---|---|
| | ⋮ | ⋮ |
| 52 | つ | つ ~1902 |
| | ⋮ | |

IMAGE PROCESSING SYSTEM, IMAGE PROCESSING APPARATUS, IMAGE PROCESSING METHOD, AND STORAGE MEDIUM

BACKGROUND OF THE INVENTION

Field of the Invention

The present invention relates to an image processing system, an image processing apparatus, an image processing method, and a storage medium.

Description of the Related Art

OCR (Optional Character Recognition/Reader) is known as a technique for reading an image of an original with a scanner and encoding characters in the obtained scanned image. In OCR, printed characters are optically read by the scanner, and character information is identified by collation with a character shape (OCR recommended font) of a font stored in advance. Therefore, when a character of a font which is not stored (OCR non-recommended font) is read, there is a problem that the character shape cannot be correctly collated and erroneous recognition of the character information occurs, lowering the recognition accuracy of the OCR.

In order to solve the above-mentioned problem, a technique for improving OCR accuracy by converting a font of a character in an image from an OCR non-recommended font to an OCR recommended font before printing out the image is known. In Japanese Patent Laid-Open No. 2007-166287, after font information in PDL data for printing is rewritten to font information of an OCR recommended font, a raster image is generated from the PDL data and printed out, thereby improving the recognition accuracy of OCR.

In the above-described conventional technique, the font used for an image before print output is converted into a font suitable for OCR, whereby the recognition accuracy of OCR with respect to the image after print output is enhanced. However, in a case where an image that has already been printed out includes characters of a font that is not suitable for OCR, the recognition accuracy of OCR for such an image cannot be enhanced.

SUMMARY OF THE INVENTION

According to one aspect of the present invention, there is provided an image processing system comprising: at least one memory that stores a program; and at least one processor that executes the program to perform: acquiring a scanned image obtained by scanning an original; extracting a character region that includes characters from within the scanned image; performing conversion processing, for converting a font of a character included in the extracted character region from a first font to a second font, on the scanned image using a conversion model for which training has been performed in advance so as to convert characters of the first font in an inputted image into characters of the second font and output a converted image; and executing OCR on the scanned image after the conversion processing.

According to another aspect of the present invention, there is provided an image processing apparatus comprising: at least one memory that stores a program; and at least one processor that executes the program to perform: generating a scanned image by scanning an original; extracting a character region that includes characters from within the scanned image; performing processing, for converting a font of a character included in the extracted character region from a first font to a second font, on the scanned image using a conversion model for which training has been performed in advance so as to convert characters of the first font in an inputted image into characters of the second font and output a converted image; and executing OCR on the scanned image after the conversion processing.

According to still another aspect of the present invention, there is provided an image processing method including: acquiring a scanned image obtained by scanning an original; extracting a character region that includes characters from within the scanned image; performing conversion processing, for converting a font of a character included in the extracted character region from a first font to a second font, on the scanned image using a conversion model for which training has been performed in advance so as to convert characters of the first font in an inputted image into characters of the second font and output a converted image; and executing OCR on the scanned image after the conversion processing.

According to yet another aspect of the present invention, there is provided a non-transitory computer-readable storage medium storing a computer program for causing a computer to execute an image processing method including: acquiring a scanned image obtained by scanning an original; extracting a character region that includes characters from within the scanned image; performing conversion processing, for converting a font of a character included in the extracted character region from a first font to a second font, on the scanned image using a conversion model for which training has been performed in advance so as to convert characters of the first font in an inputted image into characters of the second font and output a converted image; and executing OCR on the scanned image after the conversion processing.

Further features of the present invention will become apparent from the following description of exemplary embodiments (with reference to the attached drawings).

BRIEF DESCRIPTION OF THE DRAWINGS

FIG. 3 is a block diagram showing an example of a hardware configuration of a server.

FIG. 4 is a block diagram showing an example of a hardware configuration of an information terminal.

FIG. 6 is a flowchart showing a procedure of processing for generating training data.

FIG. 7 shows an example of training images used as training data.

FIG. 8 shows an example of a database for storing training data.

FIG. 16 shows an example of a database for storing training data.

FIGS. 17A and 17B show an example of font conversion.

FIG. 18 is a flowchart showing a procedure for font conversion processing.

FIGS. 19A and 19B show an example of databases for storing training data.

DESCRIPTION OF THE EMBODIMENTS

Figure 1:
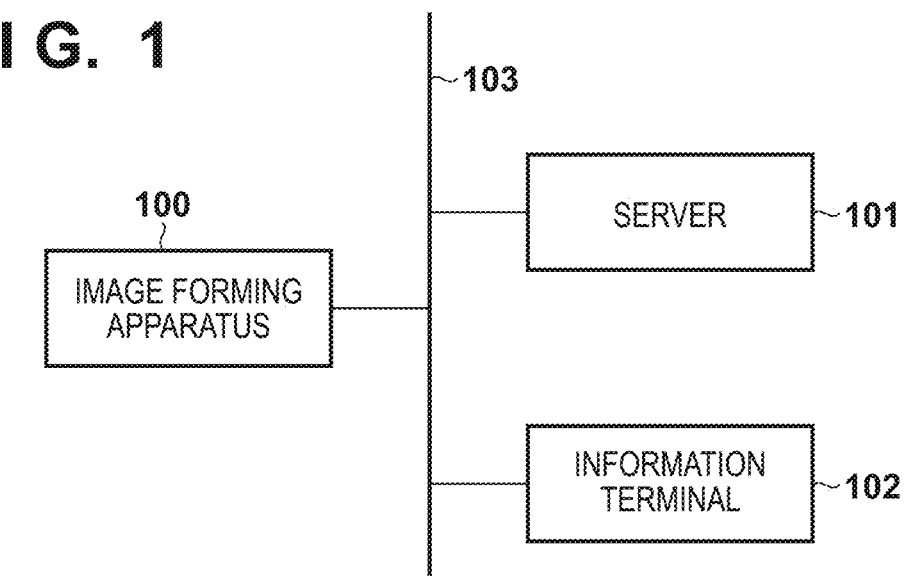
FIG. 1 shows a configuration example of an image processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the first embodiment, an example will be described in which, when OCR is performed on an image printed on a sheet, a font (character shape) of a character included in the image is converted into an OCR recommended font, and then OCR processing is executed, thereby improving the recognition accuracy of OCR.

<Configuration of Image Processing System>

FIG. 1 is a diagram showing an example of the overall configuration of an image processing system according to the present embodiment. The present image processing system is configured by an image forming apparatus (image processing apparatus) 100, a server (server apparatus) 101, and an information terminal 102, where they are connected to each other via a network 103 such as a wired LAN. The server 101 can communicate with each of the image forming apparatus 100 and the information terminal 102 via the network 103. The present image processing system may include any number of image forming apparatuses 100 and any number of information terminals 102.

<Configuration of Image Forming Apparatus>

Figure 2:
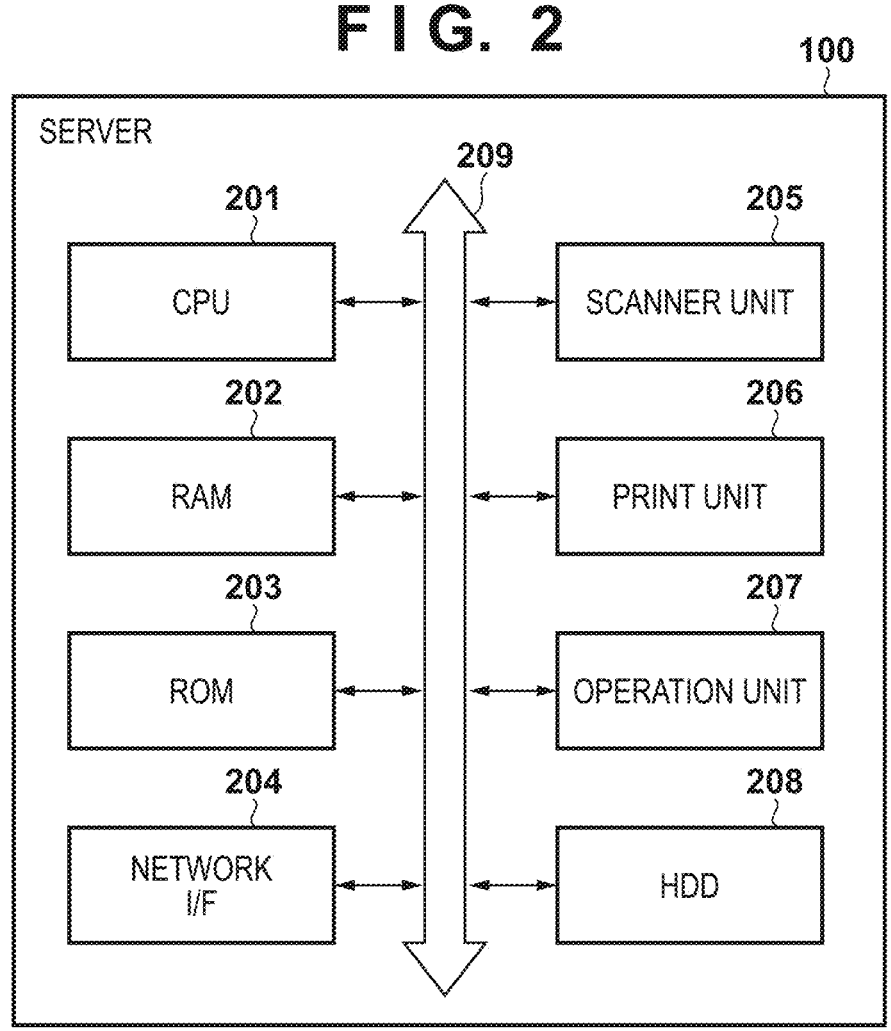
FIG. 2 is a block diagram showing an example of a hardware configuration of an image forming apparatus.

FIG. 2 is a block diagram showing an example of a hardware configuration of the image forming apparatus 100 according to the present embodiment. The image forming apparatus 100 includes a CPU 201, a RAM 202, a ROM 203, a network I/F (interface) 204, a scanner unit (reading unit) 205, a print unit 206, an operation unit 207, and an HDD 208. These devices in the image forming apparatus 100 are connected to a system bus 209.

The CPU 201 controls the entire image forming apparatus 100. The CPU 201 executes various processes by reading a program stored in a storage device such as the ROM 203 or the HDD 208 into the RAM 202 and executing the program. ROM 203 stores various programs, including a program for activating the CPU 201. The RAM 202 is used as a system work memory for the CPU 201 to operate, and is also used as a memory for temporarily storing image data. The HDD 208 is a nonvolatile storage device used for storing various data such as image data.

A network I/F 204 is connected to the network 103 and functions as a communication I/F for performing communication with an external device. The scanner unit 205 reads an image of an original and generates scan image data. The print unit 206 prints (outputs) an image on a sheet based on the input image data. The operation unit 207 is configured by a display unit for displaying various types of information and an input unit for receiving an operation by a user. The input unit is configured by, for example, a touch panel integrated with the display unit, and various switches.

<Configurations of Server and Information Terminal>

FIG. 3 is a block diagram showing an example of a hardware configuration of the server 101 according to the present embodiment. The server 101 includes a CPU 301, a RAM 302, a ROM 303, a network I/F 304, a keyboard I/F 305, a display I/F 306, an external memory I/F 307, and a mouse I/F 308. These devices in the server 101 are connected to a system bus 313. A keyboard 309, a display 310, an external memory 311 such as an HDD, and a mouse 312 are respectively connected to the keyboard I/F 305, the display I/F 306, the external memory I/F 307, and the mouse I/F 308.

The CPU 301 controls the entire server 101. The CPU 301 executes various processes by reading a program stored in a storage device such as the ROM 303 or the external memory 311 into the RAM 302 and executing the program. That is, the CPU 301 can function as a processing unit that executes the processing of each step of the flowcharts described later by executing computer programs stored in the computer-readable storage medium. ROM 303 stores various pieces of data, including a program for activating the CPU 301. The RAM 302 is used as a system work memory for the CPU 301 to operate.

FIG. 4 is a block diagram showing an example of a hardware configuration of the information terminal 102 according to the present embodiment. The information terminal 102 includes a CPU 401, a RAM 402, a ROM 403, a network I/F 404, a keyboard I/F 405, a display I/F 406, an external memory I/F 407, and a mouse I/F 408. These devices in the information terminal 102 are connected to a system bus 413. A keyboard 409, a display 410, an external memory 411 such as an HDD, and a mouse 412 are respectively connected to the keyboard I/F 405, the display I/F 406, the external memory I/F 407, and the mouse I/F 408.

The CPU 401 controls the entire information terminal 102. The CPU 401 executes various processes by reading a program stored in a storage device such as the ROM 403 or the external memory 411 into the RAM 402 and executing the program. That is, the CPU 401 can function as a processing unit that executes the processing of each step of the flowcharts described later by executing computer programs stored in the computer-readable storage medium. ROM 403 stores various pieces of data, including a program for activating the CPU 401. The RAM 402 is used as a system work memory for the CPU 401 to operate.

<Operation of Image Processing System>

Figure 5A:
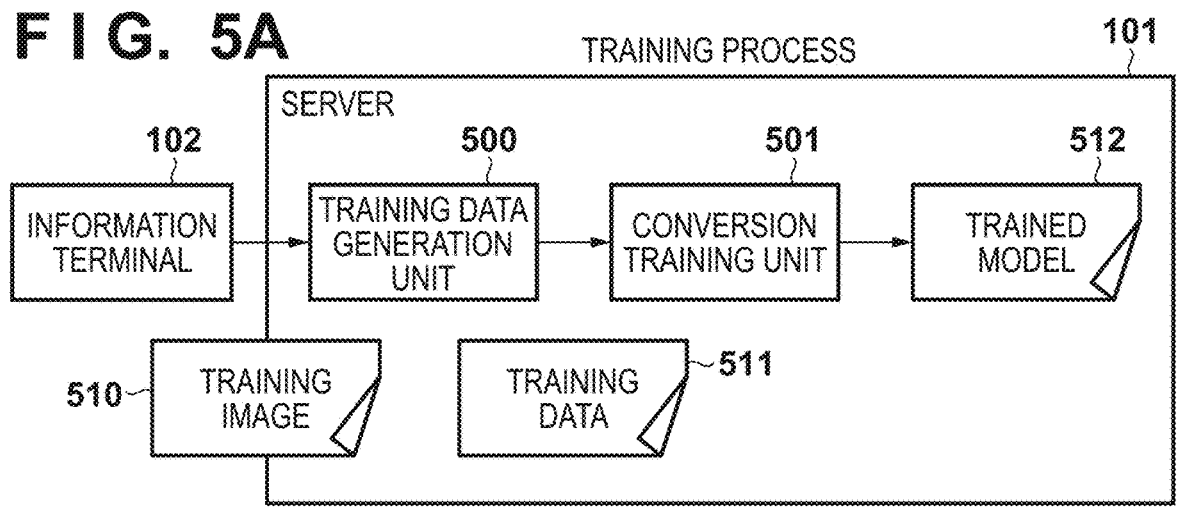
FIGS. 5A and 5B show an example of a functional configuration and an example of operation of the image processing system.
Figure 5B:
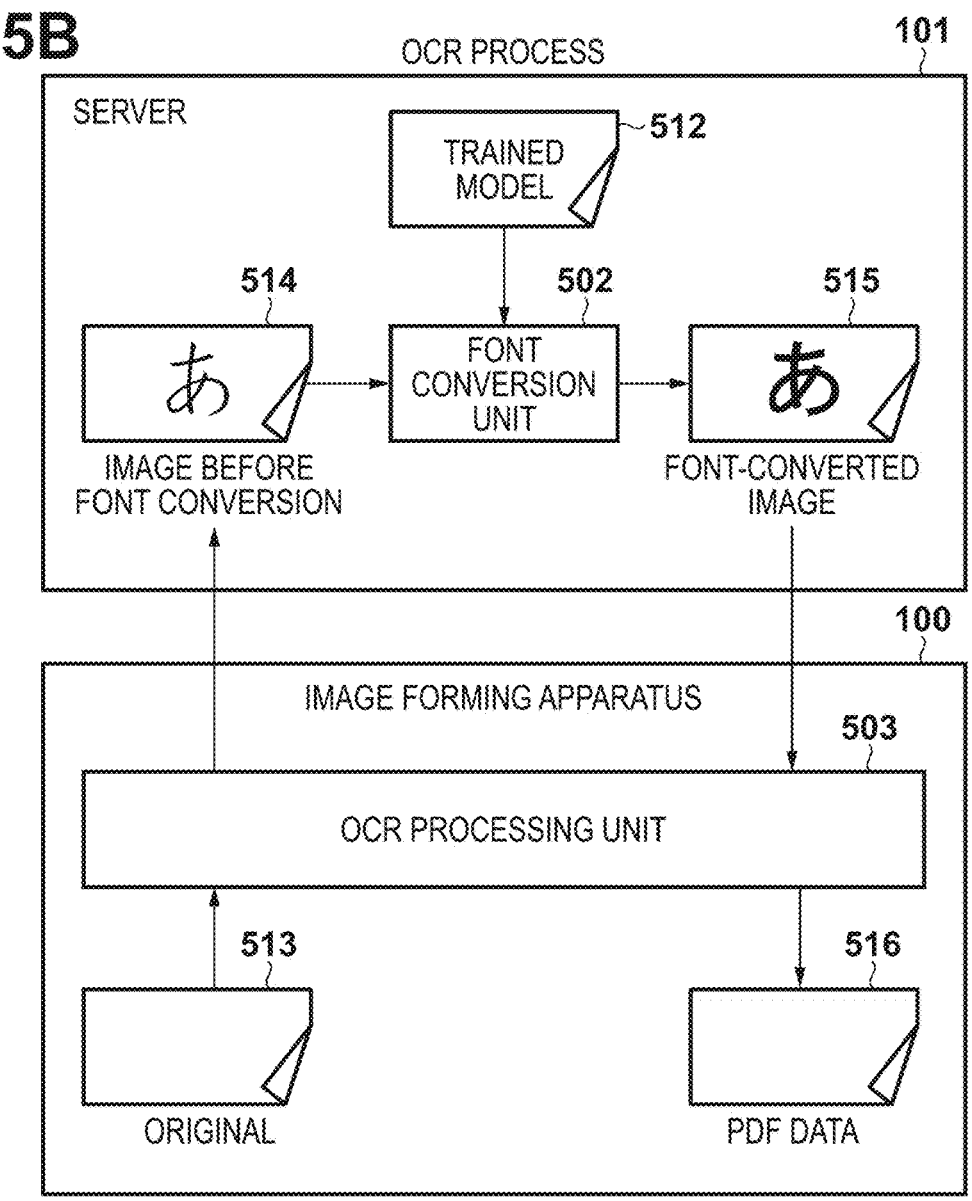

FIGS. 5A and 5B are diagrams illustrating examples of a functional configuration and operation of the image processing system according to the present embodiment. The processing executed in the image processing system is roughly divided into two types of processing. Specifically, these two types of processing are training processing (FIG. 5A) for training font conversion and OCR processing (FIG. 5B) for executing OCR after applying font conversion.

The training process shown in FIG. 5A is executed by a training data generation unit 500 and a conversion training unit 501 which are disposed in the server 101. The training data generation unit 500 first receives a plurality of training image sets 510 from an external device such as the information terminal 102. A training image set 510 is images transmitted from an application that operates on the information terminal 102. For example, the training image set 510 includes an image printed using an OCR non-recommended font and an image printed using an OCR recommended font.

The OCR recommended font is a font that has a high recognition accuracy in OCR and is recommended to be used for characters in an image that is a target of OCR. In contrast, the OCR non-recommended font is a font whose character recognition accuracy in OCR is lower than that of the OCR recommended font, and is a font which is not recommended to be used for characters in an image which is a target of OCR. In the present embodiment, the OCR non-recommended font is an example of a first font (first character shape), and the OCR recommended font is an example of a second font (second character shape).

The training data generation unit 500 generates training data 511 based on the received plurality of training image sets 510. The generated training data 511 includes a set of an image printed using an OCR non-recommended font and an image printed using an OCR recommended font. The generated training data 511 is input from the training data generation unit 500 to the conversion training unit 501.

The conversion training unit 501 uses the training data 511 to perform training for converting a font of a character included in an image that is a processing target. The conversion training unit 501 uses an existing deep learning technique for converting a character in an image into a character of another shape, for example, as described in the non-patent literature "An End-To-End Deep Chinese Font Generation System" (URL: http://www.icst.pku.edu.cn/zlian/docs/20181024110234919639.pdf). In the above non-patent literature, a set of a character image of a font and a handwritten character image thereof is used as training data, and training is performed by inputting the training data to an untrained model, thereby generating a trained model (conversion model) capable of converting a character of a font into a handwritten character. By inputting an arbitrary character image to the trained model, the input character image is converted into a character image that appears if it were written by hand.

In the present embodiment, the conversion training unit 501 inputs the training data 511 that includes a character image of one font and a character image of another font as a set to an untrained model to perform training. As a result, the conversion training unit 501 generates a trained model 512 that can convert a character of one font in an image that is a processing target into a character of another font. The trained model 512 corresponds to a conversion model for which training has been performed in advance so as to convert characters of the OCR non-recommended font (first font) in an input image into characters of the OCR recommended font (second font) and output a converted image.

The OCR processing shown in FIG. 5B is executed by an OCR processing unit 503 disposed in the image forming apparatus 100 and a font conversion unit 502 disposed in the server 101. First, the OCR processing unit 503 of the image forming apparatus 100 reads (scans) an image of a sheet original (original) 513 by the scanner unit 205, and transmits the obtained image (scanned image) to the server 101. The original 513 is transmitted to the server 101 as an image 514 before font conversion.

After receiving the image 514 before font conversion, the server 101 inputs the image 514 to the font conversion unit 502. The font conversion unit 502 acquires the trained model 512 generated by the conversion training unit 501 described above, and inputs the image 514 before font conversion to the trained model 512. Thus, the trained model 512 converts the input image 514 before font conversion to a font-converted image 515, and outputs the font-converted image 515. The server 101 transmits the font-converted image 515 outputted from the font conversion unit 502 to the image forming apparatus 100.

After receiving the font-converted image 515 from the server 101, the image forming apparatus 100 inputs the image 515 to the OCR processing unit 503. The OCR processing unit 503 executes OCR on the font-converted image 515 to output an OCR result 516. The OCR result 516 is outputted in, for example, a text file format or a PDF (Portable Document Format) file format in which scanned images and character information obtained in the OCR are stored as one file.

<Process of Generating Training Data>

FIG. 6 is a flowchart showing a procedure of processing for generating training data by the training data generation unit 500 in the server 101. The processing of each step of FIG. 6 may be implemented by the CPU 301 executing a program stored in the ROM 303, the RAM 302 or the external memory 311.

In step S600, the CPU 301 (training data generation unit 500) acquires a plurality of training image sets 510 by receiving a plurality of training image sets 510 transmitted from the information terminal 102. The server 101 receives, as the training image set 510 as shown in FIG. 7, an image 700 printed with the OCR non-recommended font and an image 701 printed with the OCR recommended font and that corresponds to the image 700. In addition to receiving the training image 510 from the information terminal 102, the server 101 may generate the training image set 510 in the server 101.

The training image set 510 of the present embodiment is images each in which only one character is included in the image, as in the images 700 and 701 of FIG. 7. Each image is an image in which a symbol such as kanji, katakana, hiragana, punctuation marks, and the like represented in a character code table is printed as a character. Among the images 700 and 701, it is desirable that, without the position of a character in one image being not shifted or tilted with respect to the position of the character in the other image, the positions of the characters in both images are aligned.

Next, in step S601, the CPU 301 generates training data 511 based on the training image sets 510 acquired in step S600, stores the generated training data 511 in the external memory 311, and ends the processing. FIG. 8 is a diagram showing an example of a database (DB) that is for storing the training data 511 and is provided in the external memory 311 in the server 101. A DB 800 is configured by fields of identifiers (IDs) 801, fields of pre-conversion images 802, and fields of correct images 803.

In this embodiment, the CPU 301 generates and stores the training data 511 that includes a set of an image 700 printed with an OCR non-recommended font and a corresponding image 701 printed with an OCR recommended font, acquired as a training image 510, in the DB 800. The image 700 printed by the OCR non-recommended font is stored in the DB 800 as a pre-conversion image 802. The image 701 printed by the OCR recommended font is stored in the DB 800 as a corresponding correct image 803.

More specifically, as shown in FIG. 8, an ID 801 is given to a set of one image 700 and a corresponding one image 701, and the set is stored in the DB 800 as one data item. At this time, the image 700 is stored as the pre-conversion image 802, and the image 701 is stored in the DB 800 as the correct image 803. The ID 801 is applied to a respective set to identify a distinct set of a pre-conversion image 802 and a correct image 803. In this way, the fields of the pre-conversion image 802 are used to retain images printed using OCR non-recommended fonts. In addition, the fields of the correct image 803 are used to retain images printed using OCR recommended fonts. The data stored in the DB 800 constitutes training data 511 used for training by the conversion training unit 501.

In the present embodiment, the pre-conversion image 802 is an example of a first image that includes a character represented by an OCR non-recommended font (first font). The correct image 803 is an example of a second image that includes a character that is the same as the character included in the first image and is represented by an OCR recommended font (second font). The training data generation unit 500 generates training data 511 that includes such a pre-conversion image 802 (first image) and a correct image 803 (second image). In the present embodiment, as shown in FIG. 8, the training data generation unit 500 generates training data 511 that includes a pre-conversion image 802 that includes only one character and a correct image 803 that includes only one character.

<Processing for Training Font Conversion>

Figure 9:
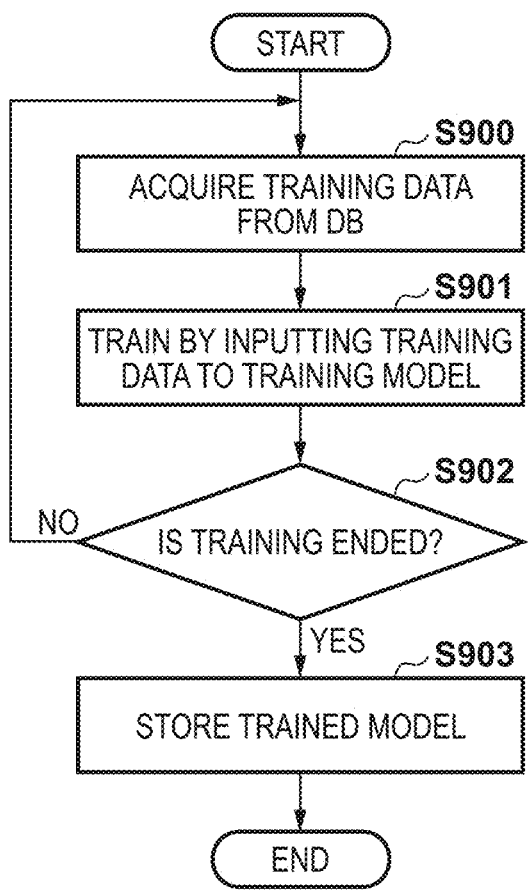
FIG. 9 is a flowchart showing a font conversion training process.

FIG. 9 is a flowchart showing a procedure of processing for training font conversion by the conversion training unit 501 in the server 101. The processing of each step of FIG. 9 may be implemented by the CPU 301 executing a program stored in the ROM 303, the RAM 302 or the external memory 311. The conversion training unit 501 performs training based on the training data 511 generated by the training data generation unit 500 thereby generate a trained model, which is a conversion model.

First, in step S900, the CPU 301 (conversion training unit 501) acquires training data from DB 800. As shown in FIG. 8, the training data acquired from DB 800 includes a plurality of sets each of which is configured by a pre-conversion image 802 and a corresponding correct image 803. Next, in step S901, the CPU 301 inputs the acquired training data into an untrained model (or a model for which training is underway), and performs training of font conversion. For the training model into which the training data is inputted, training for converting the pre-conversion image 802 (image printed using the OCR non-recommended font) into the correct image 803 (image printed using the OCR recommended font) is performed based on the inputted training data.

Thereafter, in step S902, the CPU 301 determines whether or not the training has completed. In this example, the CPU 301 determines whether or not the number of times of executing training has reached a number of times of training that is specified in advance. When the number of times of execution has reached the specified number of times of training, the CPU 301 determines that the training has been completed and advances the process to step S903, and when the number of times of execution has not reached the specified number of times of training, the CPU 301 determines that the training has not been completed and returns the process to step S900.

The specified number of times of training is the number of images stored in the DB 800 that are used for training. For example, the same number of times of training is specified in advance for all images stored in the DB 800, but a different number of times of training may be specified for each image. For example, as shown in FIGS. 7 and 8, when training is performed using an image in which only one character is included in an image, the number of images used as training images is much larger for images of kanji than for images of characters such as hiragana, katakana, and punctuation marks. Therefore, as a result of training, there is a possibility that a trained model in which the font conversion accuracy for kanji is relatively high and the font conversion accuracy for hiragana and katakana is relatively low is generated. In this case, configuration may be taken to set a large number of times for training of symbols such as hiragana, katakana, and punctuation marks, and set a small number of times for training of kanji.

In step S903, the CPU 301 stores the model obtained by the training in step S901 as the trained model 512 in the external memory 311, and ends the processing.

<OCR Processing and Font Conversion Processing>

Figure 10:
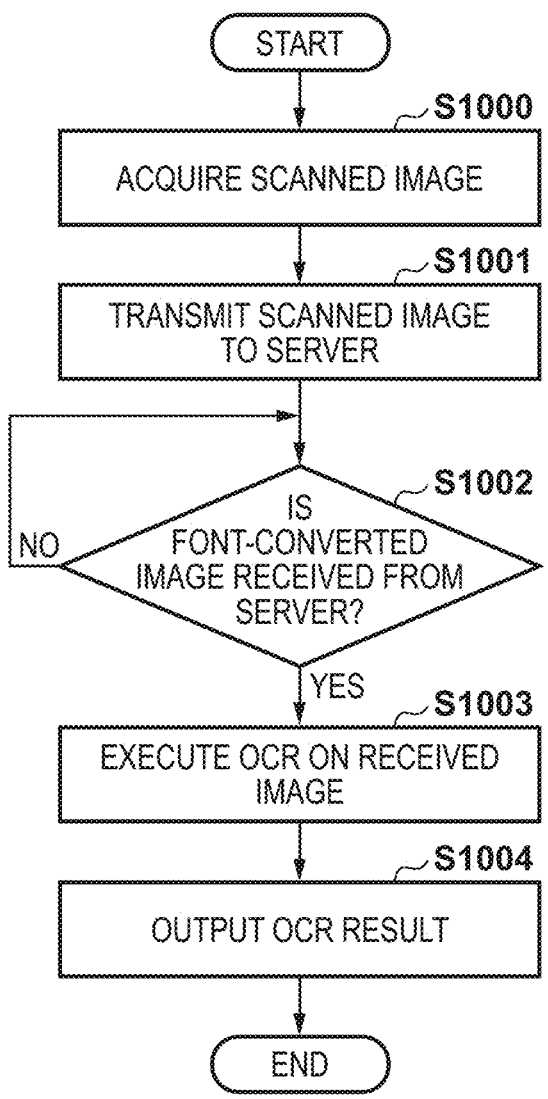
FIG. 10 is a flowchart showing a procedure of OCR processing.
Figure 11:
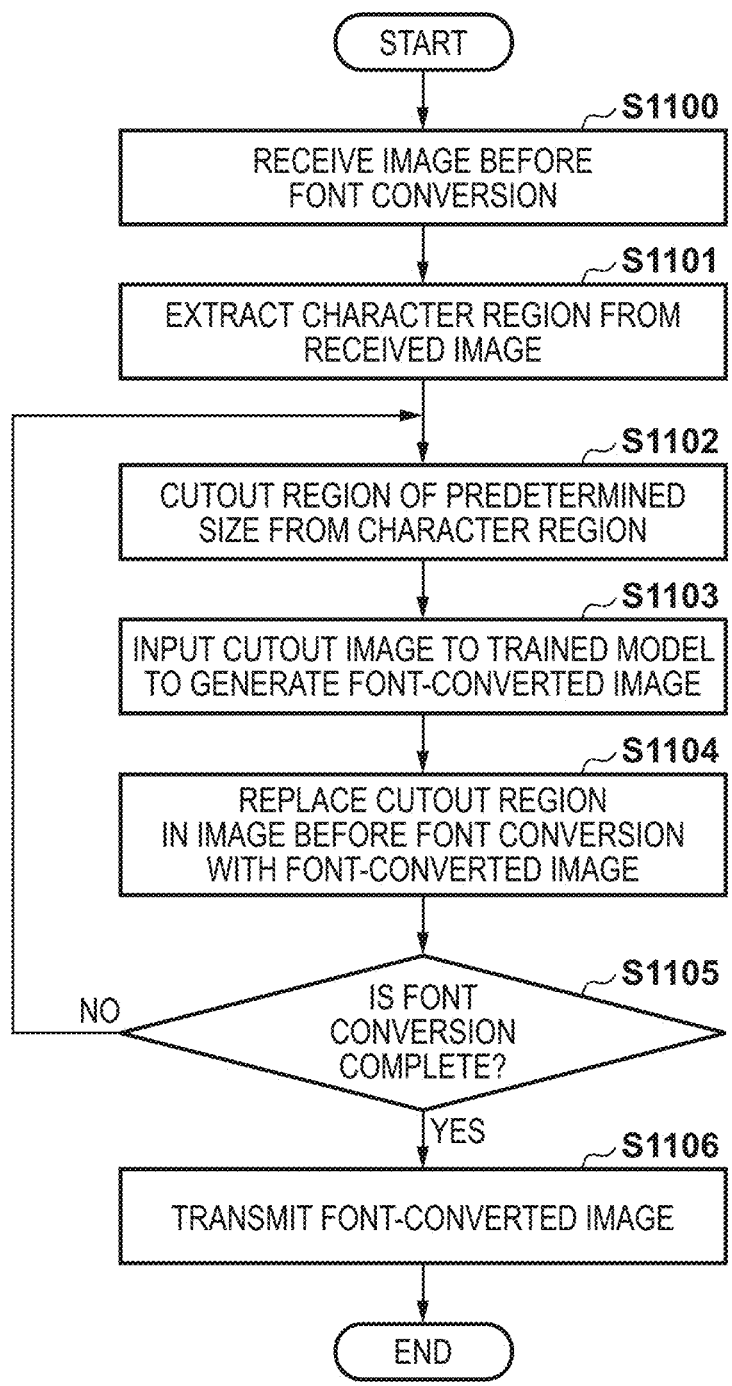
FIG. 11 is a flowchart showing a procedure for font conversion processing.

FIG. 10 is a flowchart showing a procedure of OCR processing by the OCR processing unit 503 in the image forming apparatus 100. The processing of each step of FIG. 10 may be implemented, in the image forming apparatus 100, by the CPU 201 executing a program stored in the ROM 203, the RAM 202 or the HDD 208. FIG. 11 is a flowchart showing a procedure of font conversion processing executed by the font conversion unit 502 in the server 101. The processing of each step of FIG. 11 may be implemented, in the server 101, by the CPU 301 executing a program stored in the ROM 303, the RAM 302 or the external memory 311.

(Processing in Image Forming Apparatus 100)

In the following processing, the image forming apparatus 100 transmits a scanned image acquired by the OCR processing unit 503 to the server 101, and receives the scanned image after conversion by the font conversion unit 502 from the server 101. In the image forming apparatus 100, the OCR processing unit 503 executes OCR on the scanned image received from the server 101.

Figure 12A:
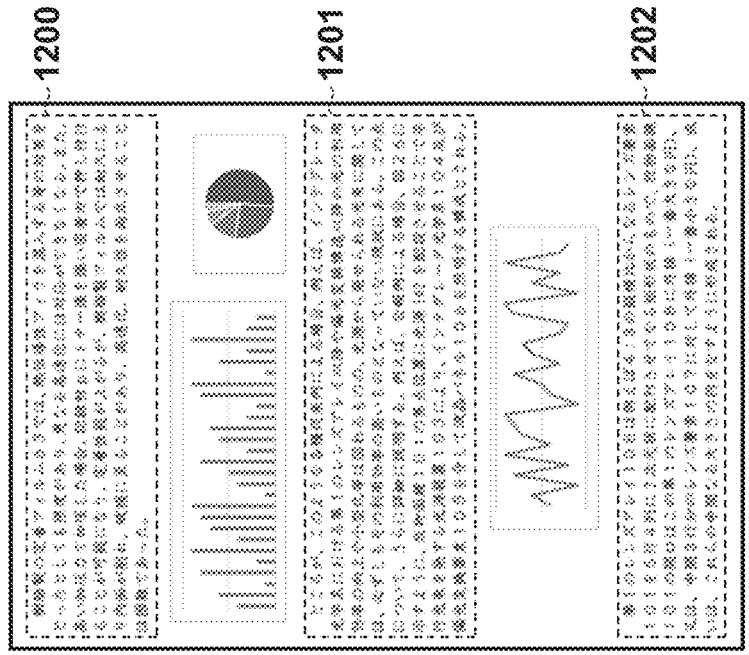
FIGS. 12A and 12B show an example of a scanned image and character regions within the scanned image.

First, in step S1000, the CPU 201 (OCR processing unit 503) acquires a scanned image by reading an image of the original 513 using the scanner unit 205. Here, a case where the scanned image shown in FIG. 12A is obtained will be described as an example.

Thereafter, in step S1001, the CPU 201 transmits the scanned image to the server 101. In the server 101, font conversion processing is executed on the transmitted scanned image, and as a result of the processing, a font-converted image is transmitted from the server 101 to the image forming apparatus 100. Therefore, the CPU 201 determines whether or not the font-converted image is received from the server 101 in step S1002, and waits until the font-converted image is received from the server 101.

(Processing in Server 101)

Figure 12B:
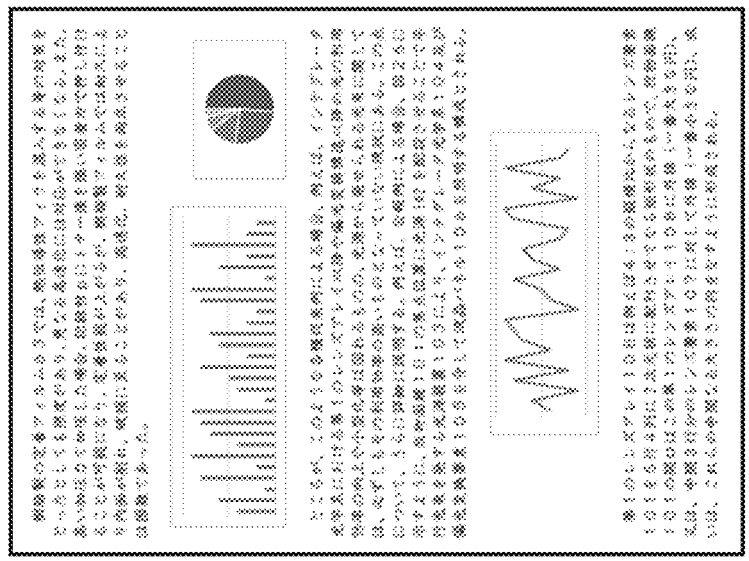

In the server 101, in step S1100, the CPU 301 (font conversion unit 502) receives the scanned image transmitted from the image forming apparatus 100 in step S1001 as the image 514 before font conversion. After receiving the image 514 before font conversion, in step S1101, the CPU 301 extracts a character region from the received image by executing image region separation processing on the received image. For example, when the image region separation processing is executed on the image of FIG. 12A received from the image forming apparatus 100, regions indicated by dotted line frames in FIG. 12B are extracted as character regions 1200, 1201, and 1202.

Figures 13A, 13B:
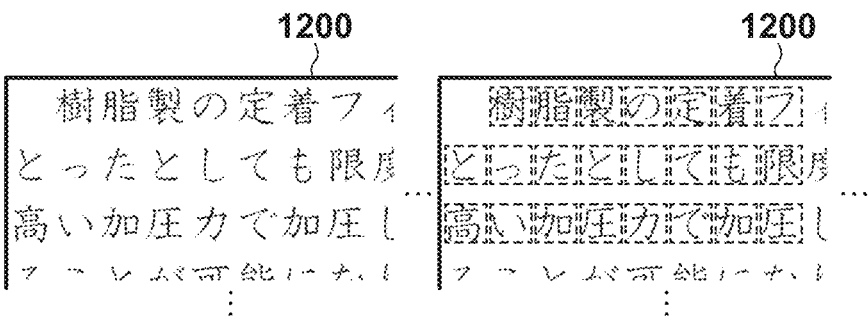
FIGS. 13A to 13C show an example of font conversion.

Next, in step S1102, the CPU 301 sequentially cuts out a region of a predetermined size from the character region extracted in step S1101, and advances the process to step S1103. In the present embodiment, the region of the predetermined size is a region that includes one character. That is, the CPU 301 cuts out each character one by one from the character region in step S1102. An existing character cutout technique (for example, Japanese Patent Laid-Open No. 2013-182512) can be used to cut out characters. For example, when characters are cut out from the character region 1200 shown in FIG. 13A, a character image for each character, as indicated by dotted line frames in FIG. 13B, is obtained.

In step S1103, the CPU 301 inputs an image cut out from the character region that is a processing target (a character image in the present embodiment) into the trained model 512. As a result, the CPU 301 generates a font-converted image (after font conversion of the character included in the input image) corresponding to the input image, and advances the processing to step S1104. As described above, in the present embodiment, the CPU 301 (font conversion unit 502) sequentially cuts out the characters included in the character region one by one, and inputs the images of the cutout characters to the trained model 512 to perform conversion processing. In step S1103, the trained model 512 stored in the external memory 311 in step S903 is read and used.

In step S1104, the CPU 301 replaces the cutout region (cutout character) in the image before font conversion with the font-converted image obtained in step S1103. Thereafter, in step S1105, the CPU 301 determines whether or not the font conversion processing has been completed. Specifically, the CPU 301 determines whether or not the processing of step S1102 to step S1104 has been completed for the characters included in all the character regions extracted in step S1101 (that is, whether or not the replacement of the characters included in all the character regions with font-converted characters has been completed). If it is determined that the font conversion processing has not been completed, the CPU 301 returns the processing to step S1102, and executes the processing of step S1102 to step S1104 again with another character region as a processing target.

Figure 13C:

If the CPU 301 determines that the font conversion processing has been completed, the processing proceeds from step S1105 to step S1106. When the font conversion processing is completed, as shown in FIG. 13C, an image in which the font of characters included in all the character regions 1200, 1201, and 1202 has been converted is obtained. In step S1106, the CPU 301 transmits the font-converted image corresponding to the image received in step S1100 to the image forming apparatus 100, and ends the processing.

(Processing in Image Forming Apparatus 100)

Returning to the description of the flowchart of FIG. 10, when the CPU 201 receives the font-converted image from the server 101, the process proceeds from step S1002 to step S1003. In step S1003, the CPU 201 executes OCR on the received font-converted image. As a result, character information included in the scanned image is obtained.

Thereafter, in step S1004, the CPU 201 outputs an OCR result, and ends the OCR processing. The OCR result is outputted in, for example, a text file format or a PDF file format. In a case of outputting a text file, the CPU 201 writes the character information obtained in step S1003 to the text file. In a case of outputting a PDF file, the CPU 201 writes the scanned image acquired in step S1000 and the character information acquired in step S1003 together to the PDF file.

As described above, in the present embodiment, the image forming apparatus 100 (OCR processing unit 503) acquires a scanned image obtained by scanning an original, and transmits the scanned image to the server 101. The server 101 (font conversion unit 502) extracts, from the scanned image, a character region that includes characters. Further, the server 101 (font conversion unit 502) performs conversion processing for converting the font of characters included in the extracted character region from an OCR non-recommended font (first font) to an OCR recommended font (second font), on the scanned image. In this conversion processing, a trained model for which training has been performed in advance so as to convert characters of the OCR non-recommended font (first font) in the inputted image into characters of the OCR recommended font (second font) is used. The image forming apparatus 100 receives the converted scanned image from the server 101, and executes OCR on the received scanned image.

More specifically, the server 101 generates a set of an image printed using the OCR non-recommended font and an image printed using the OCR recommended font as training data, and performs training based on the training data. With this, it is possible to convert an image printed using an unknown OCR non-recommended font into an image printed using an OCR recommended font. Further, by executing OCR on the converted image, it is possible to improve the recognition accuracy of the OCR. That is, it is possible to improve the recognition accuracy of the OCR regardless of the font used for an image to be processed.

In the present embodiment, an example in which the training data generation unit 500, the conversion training unit 501, and the font conversion unit 502 are arranged in the server 101 has been described, but all of these can be arranged in the image forming apparatus 100. In other words, the training process shown in FIG. 5A and the OCR processing shown in FIG. 5B can all be executed in the image forming apparatus 100. That is, the image forming apparatus 100 may be configured to include the training data generation unit 500, the conversion training unit 501, the font conversion unit 502, and the OCR processing unit 503.

In the present embodiment, an example has been described in which a set of an image printed using a certain type of OCR non-recommended font and an image printed using a certain type of OCR recommended font is used as training data. However, training data may be generated using images printed using a plurality of different types of OCR non-recommended fonts instead of one type of OCR non-recommended font. That is, a trained model may be generated that enables conversion from an image printed using a plurality of different types of OCR non-recommended fonts to an image printed using one type of OCR recommended font. As a result, even when characters of a plurality of types of OCR non-recommended fonts are included in an image of an original that is to be scanned, if training has been performed for all the types of OCR non-recommended fonts, the font of each character can be converted into one type of OCR recommended font.

In addition, the image used as the pre-conversion image 802 may be an image in which an image printed using an OCR recommended font is deteriorated. That is, the training data generation unit 500 may generate training data that includes a set of the pre-conversion image 802 and the correct image 803 by using, as the pre-conversion image 802, an image that includes a character resulting from a character represented by the OCR recommended font included in the correct image 803 changing to a deteriorated state.

Figure 14:
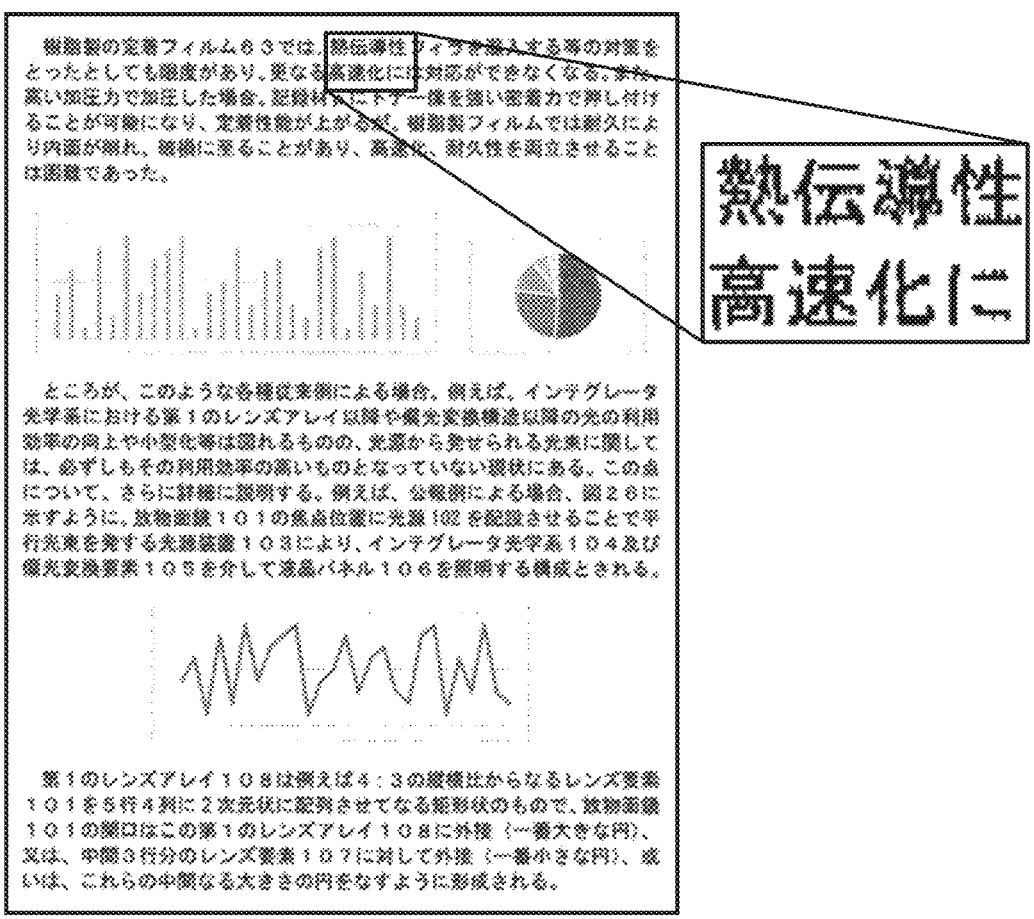
FIG. 14 shows an example of an image in which characters have deteriorated.

For example, as shown in FIG. 14, an image in which each character included in an image printed using an OCR recommended font is changed to a fuzzy state by FAX transmission may be used as the pre-conversion image 802. Characters that have changed to a fuzzy state by fax transmission are greatly changed in shape even if they are printed with an OCR recommended font, so that the recognition accuracy of such characters in OCR is generally lowered. In this case, training may be performed using an image of a character changed to a fuzzy state by FAX transmission as a pre-conversion image 802, and an image of the character before FAX transmission as a correct image 803. By such training, it is possible to generate a trained model capable of converting a character changed to a fuzzy state by FAX transmission into the character before FAX transmission (before it is changed to a fuzzy state). In addition, by executing font conversion and OCR using the generated trained model, it is possible to improve the recognition accuracy of OCR.

Second Embodiment

In the first embodiment, an example has been described in which an image that includes only one character in an image is used as a training image used for training by the conversion training unit 501. In the second embodiment, an example in which an image that includes a plurality of characters in an image is used as a training image will be described. In the following, description of portions common to those of the first embodiment will be omitted, and portions that differ will be described.

<Processing for Generating Training Data>

In the present embodiment, similarly to the first embodiment, the training data generation unit 500 executes processing for generating training data according to the procedure shown in FIG. 6. In the present embodiment, the training data generation unit 500 generates training data 511 that includes a set of a pre-conversion image 802 (first image) and a correct image 803 (second image) that each include a plurality of characters.

Figure 15A:
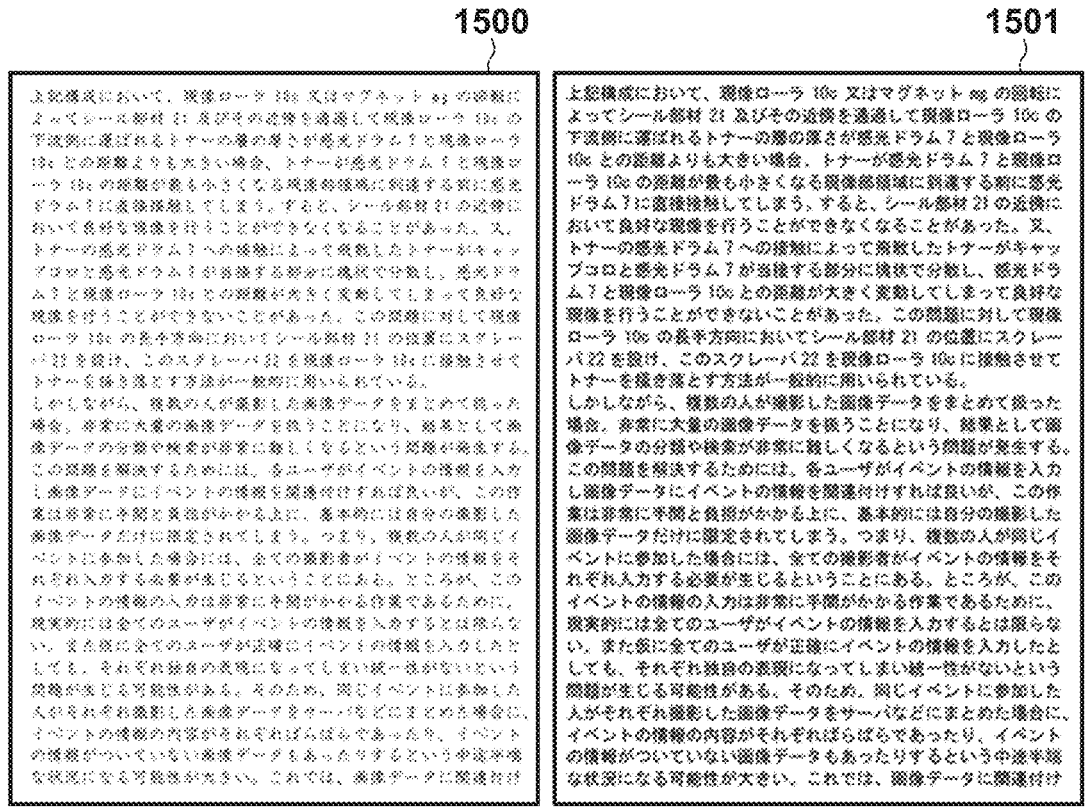
FIGS. 15A and 15B show an example of training images used as training data.
Figure 15B:
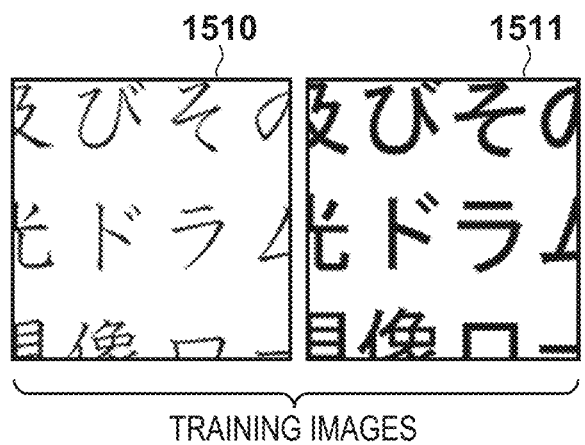

Firstly, in step S600, the training data generation unit 500 (CPU 301) receives a text image transmitted from the information terminal 102, and acquires a plurality of training images based on the received text image. FIG. 15A shows an example of a pair of text images for training that are transmitted from the information terminal 102. An image 1500 is a first text image that includes text represented in an OCR non-recommended font, and the image 1501 is a second text image that includes text represented by a OCR recommended font and corresponds to the image 1500. In step S600, the training data generation unit 500 generates training images by performing a process of cutting out images such as the images 1510 and 1511 shown in FIG. 15B from a pair of text images for training such as the images 1500 and 1501.

Thus, a pair of a first text image printed using an OCR non-recommended font and a corresponding second text image printed using an OCR recommended font is received and used to generate training images. In each of the first text image and the second text image, the training data generation unit 500 cuts out a region of a predetermined size (corresponding to the same position) to obtain a partial image. In each of the first text image and the second text image, the training data generation unit 500 cuts out such a partial image a plurality of times with respect to a different region for each time. As a result, a partial image to be used as the pre-conversion image 802 (first image) and a partial image to be used as the correct image 803 (second image) are generated as training images. Such cutout processing can be performed so that all characters included in the received text image are included in the plurality of acquired partial images.

In step S600, a plurality of text images that includes different text (characters) may be received from the information terminal 102 and used to generate training images. Although the text image received from the information terminal 102 may be an image that includes any text, it is preferable that the image includes text for which OCR is frequently performed. Further, the number of times of execution of the above-described cutout processing may be determined in accordance with, for example, the number of characters included in the text image.

Next, in step S601, the CPU 301 generates training data 511 based on the training images acquired in step S600, stores the generated training data 511 in the external memory 311, and ends the processing. FIG. 16 is a diagram showing an example of a DB according to the present embodiment that is for storing the training data 511 and is provided in the external memory 311 in the server 101. In the present embodiment, images that includes a plurality of characters (e.g., images 1500 and 1501) generated in step S600 are, as the pre-conversion image 802 and the correct image 803, stored in a DB 1600, which differs from the DB 800 of the first embodiment, as the training data 511.

<Processing for Training Font Conversion>

In the present embodiment, similarly to the first embodiment, the conversion training unit 501 executes processing for training font conversion according to the procedure shown in FIG. 9. The conversion training unit 501 inputs the training data 511 stored in the DB 1600 to an untrained model (or a model for which training is underway) (step S900). As a result, the conversion training unit 501 generates a trained model capable of performing font conversion from an OCR non-recommended font to an OCR recommended font, for an image that includes a plurality of characters, and stores the generated trained model in the external memory 311 (step S903).

<OCR Processing and Font Conversion Processing>

In the present embodiment, the OCR processing unit 503 of the image forming apparatus 100 executes the OCR processing in accordance with the procedure shown in FIG. 10, as in the first embodiment. Similarly to in the first embodiment, the font conversion unit 502 of the server 101 executes font conversion processing according to the procedure shown in FIG. 11.

However, in the present embodiment, in step S1102 the font conversion unit 502 (CPU 301) cuts out regions having a size that each includes a plurality of characters when cutting out, from the character region extracted in step S1101, regions having a predetermined size in order. For example, when performing a cutout with respect to the character region 1200 shown in FIG. 17A, the font conversion unit 502 performs cutout in order for regions of the size indicated by the dotted line frame in FIG. 17B.

After that, the font conversion unit 502 performs similar processing as that of the first embodiment in step S1103 to step S1106. When the font conversion processing of the present embodiment is completed ("YES" in step S1105), similarly to in the first embodiment, images in which the font of characters included in all the character regions 1200, 1201, and 1202 are converted as shown in FIG. 13C are obtained. The font-converted image is transmitted from the server 101 to the image forming apparatus 100.

As in the first embodiment, the OCR processing unit 503 executes OCR on the font-converted image received from the server 101 (step S1003), outputs the OCR result (step S1004), and ends the processing.

As described above, in the present embodiment, the font conversion unit 502 sequentially cuts out regions of a predetermined size from the character region extracted from the scanned image, and inputs the image of the cutout regions to the trained model 512 to thereby perform font conversion processing. According to the present embodiment, the process of cutting out characters one by one from the character region, which is necessary in the first embodiment, becomes unnecessary.

Third Embodiment

In the first embodiment, an example in which a font of characters included in a scanned image is converted into an OCR recommended font is described. However, since characters printed using various fonts can be included in an actual scanned image, there could be a case where characters before font conversion are already be characters of an OCR recommended font. In the present embodiment, font conversion is not performed on characters that have already been printed using an OCR recommended font, thereby shortening the time required for font conversion processing. In the following, description of portions common to those of the first embodiment will be omitted, and portions that differ will be described.

<Font Conversion Processing>

In the present embodiment, the font conversion unit 502 of the server 101 executes font conversion processing according to the procedure shown in FIG. 18. The flowchart of FIG. 18 differs from the flowchart of FIG. 11 in the first embodiment in that step S1800 is added between step S1102 and step S1103.

However, in the present embodiment, after cutting out, from the character region extracted in step S1101, regions having a predetermined size in order in step S1102, the font conversion unit 502 (CPU 301) advances the process to step S1800.

In step S1800, the font conversion unit 502 determines whether or not a cutout region is a font conversion target region. Specifically, in a case where a character of an OCR non-recommended font is included in the cutout region, the font conversion unit 502 determines that the cutout region is a font conversion target region, and advances the process to step S1103. In contrast, in a case where a character of an OCR non-recommended font is not included in the cutout region, the font conversion unit 502 determines that the cutout region is not a font conversion target region, and returns the process to step S1102.

The determination processing in step S1800 can be realized by using, for example, a technique of classifying images using deep learning as described in the non-patent literature "ImageNet Classification with Deep Convolutional Neural Networks" (URL: https://papers.nips.cc/paper/ 4824-imagenet-classification-with-deep-convolutional-neural-networks.pdf). In the above-mentioned non-patent literature, it is determined, using a trained model, which category an input image is classified into from among several hundred categories defined in advance. The trained model is generated by performing training using sets of an image and a category of the image as tag information.

In the present embodiment, training is performed, in addition to using an image that includes characters, using an OCR recommended font or an OCR non-recommended font as tag information together, to thereby generate a trained model. By inputting an image that includes characters to the trained model, it can be determined whether the inputted image is an image printed using an OCR recommended font or an image printed using an OCR non-recommended font.

As described above, in the present embodiment, the font conversion unit 502 does not perform font conversion processing on characters of the OCR recommended font (second font) from among characters included in a character region extracted from the scanned image. In this manner, by not executing the font conversion processing on an image printed with the OCR recommended font, it is possible to shorten the time required for the font conversion processing.

Fourth Embodiment

Even when OCR is performed on an image without deterioration, which is printed using an OCR recommended font, there are cases where the character recognition accuracy is low. For example, when OCR is performed on a small character representing a yōon or a sokuon (e.g., " ", " ", or " "), such characters may be misrecognized as large characters rather than small characters.

Therefore, in the fourth embodiment, a correct image that includes a small character smaller than a normal character size is generated as a small character correct image, and the generated correct image is included in the training data for use in the training process of font conversion. Thus, in the font conversion of a small character, conversion to a character having a size smaller than a the normal character size is performed, and it is possible to improve the accuracy of recognition of a small character in OCR. In the following, description of portions common to those of the first embodiment will be omitted, and portions that differ will be described.

FIG. 19A shows examples of the training data stored in the DB 800 according to the first embodiment. In the pre-conversion image 802 and the correct image 803 stored in the DB 800, small characters representing a yōon or a sokuon is included among normal sizes. In contrast, FIG. 19B shows a DB 1900 according to the present embodiment. The DB 1900 stores, as a correct image that includes a small character, a correct image 1902 that includes a small characters that is smaller than a small character included in the correct image 1901 shown in FIG. 19A.

As described above, in the present embodiment, when the pre-conversion image 802 (the first image) includes a small character, the size of the small character included in the correct image 803 (the second image) is made smaller than the size of the small character included in the pre-conversion image 802. By using the training data as described above in the training process of font conversion, a trained model for converting an image that includes a small character into an image that includes a character having a size smaller than a normal character size is generated. Further, using the generated trained model, the OCR processing for which the font conversion as in the first to third embodiments is applied is performed. As a result, it is possible to improve the recognition accuracy of small characters in OCR.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070710, filed Apr. 2, 2019, which is hereby incorporated by reference herein in its entirety.

What is claimed is:

1. An image processing system comprising:
   at least one memory that stores a program; and
   at least one processor that executes the program to perform:
   acquiring a scanned image obtained by scanning an original;
   extracting a character region that includes first character images from within the scanned image, wherein the first character images are represented by a first font;
   obtaining a converted image by converting, on the scanned image, the first character images included in the character region into second character images using a conversion model, wherein the conversion model is generated in advance by performing training based on training data, and wherein the training data includes at least one set of a first image that includes a character represented by the first font and a second image that includes a character that is the same character as the character included in the first image and is represented by a second font, and wherein the first font is a font whose character recognition accuracy in accordance with the OCR is lower than character recognition accuracy in accordance with the OCR of the second font;
   obtaining an OCR result by executing OCR on the converted image; and
   outputting the obtained OCR result as character information of the scanned image.

2. The image processing system according to claim 1, wherein
   the training data includes the at least one set of the first image and the second image that each includes one character, and
   the converted image is obtained by sequentially cutting out each character included in the character region one by one, and inputting an image of the cutout character to the conversion model.

3. The image processing system according to claim 1, wherein
   the training data is generated with the at least one set of the first image and the second image that each include a plurality of characters, and
   the converted image is obtained by sequentially cutting out a region of a predetermined size from the character region, and inputting an image of the cutout region to the conversion model.

4. The image processing system according to claim 3, wherein
   the training data is generated with the at least one set of the first image and the second image which is obtained by cutting out a region of the predetermined size from each of a first text image that includes text represented by the first font and a second text image that includes text represented by the second font.

5. The image processing system according to claim 4, wherein
   the training data is generated with a plurality of sets of the first image and the second image which are obtained by cutting out a region of the predetermined size a plurality of times with respect to a different region for each time in the first text image and the second text image.

6. The image processing system according to claim 1, wherein
   the first image is generated by changing the second image to a deteriorated state.

7. The image processing system according to claim 1, wherein
   the image processing system comprises an image processing apparatus and a server apparatus capable of communicating with the image processing apparatus,
   the image processing apparatus performs acquisition of the scanned image and OCR on the scanned image, and
   the server apparatus performs extraction of the character region and the conversion processing.

8. The image processing system according to claim 7, wherein
   the image processing apparatus
   transmits the acquired scanned image to the server apparatus,
   receives the scanned image after the conversion processing from the server apparatus, and
   executes the OCR on the scanned image received from the server apparatus.

9. An image processing apparatus comprising:
   at least one memory that stores a program; and
   at least one processor that executes the program to perform:
   generating a scanned image by scanning an original;
   extracting a character region that includes first character images from within the scanned image, wherein the first character images are represented by a first font;
   obtaining a converted image by converting, on the scanned image, the first character images included in the character region into second character images using a conversion model, wherein the conversion model is generated in advance by performing training based on training data, and wherein the training data includes at least one set of a first image that includes a character represented by the first font and a second image that includes a character that is the same character as the character included in the first image and is represented by a second font, and wherein the first font is a font whose character recognition accuracy in accordance with the OCR is lower than character recognition accuracy in accordance with the OCR of the second font;

obtaining an OCR result by executing OCR on the converted image; and outputting the obtained OCR result as character information of the scanned image.

10. An image processing method including:

acquiring a scanned image obtained by scanning an original;

extracting a character region that includes first character images from within the scanned image, wherein the first character images are represented by a first font;

obtaining a converted image by converting, on the scanned image, the first character images included in the character region into second character images using a conversion model, wherein the conversion model is generated in advance by performing training based on training data, and wherein the training data includes at least one set of a first image that includes a character represented by the first font and a second image that includes a character that is the same character as the character included in the first image and is represented by a second font, and wherein the first font is a font whose character recognition accuracy in accordance with the OCR is lower than character recognition accuracy in accordance with the OCR of the second font;

obtaining an OCR result by executing OCR on the converted image; and outputting the obtained OCR result as character information of the scanned image.

11. A non-transitory computer-readable storage medium storing a computer program for causing a computer to execute an image processing method including:

acquiring a scanned image obtained by scanning an original;

extracting a character region that includes first character images from within the scanned image, wherein the first character images are represented by a first font;

obtaining a converted image by converting, on the scanned image, the first character images included in the character region into second character images using a conversion model, wherein the conversion model is generated in advance by performing training based on training data, and wherein the training data includes at least one set of a first image that includes a character represented by the first font and a second image that includes a character that is the same character as the character included in the first image and is represented by a second font, and wherein the first font is a font whose character recognition accuracy in accordance with the OCR is lower than character recognition accuracy in accordance with the OCR of the second font;

obtaining an OCR result by executing OCR on the converted image; and outputting the obtained OCR result as character information of the scanned image.

* * * * *